Patented July 4, 1939

2,165,165

UNITED STATES PATENT OFFICE

2,165,165

METHOD OF SEPARATING ORTHO- AND PARA-AMINO-ETHYL-BENZENES

Robert R. Dreisbach and James Day, Midland, Mich., assignors to The Dow Chemical Company, Midland, Mich., a corporation of Michigan No Drawing. Application November 1, 1937, Serial No. 172,160

6 Claims. (Cl. 260—582)

This invention concerns the separation of isomeric amino-ethyl-benzenes, and is particularly concerned with the separation of ortho- and para-amino-ethyl benzene from mixtures thereof.

Amino-ethyl-benzenes can be produced by the successive halogenation and amination of ethyl-benzene. During the halogenation step, however, there is produced a mixture of ortho- and para-halogenated ethylbenzenes which cannot be separated from each other by fractional distillation or fractional crystallization. Upon amination, this mixture yields ortho-amino-ethyl-benzene and para-amino-ethyl-benzene and, since these compounds are employed as intermediates in the preparation of other organic chemicals, it is often desirable to separate the isomers from each other. Heretofore there has been no satisfactory method for accomplishing this separation. The isomers cannot be separated by fractional distillation, since their boiling points are very close together. Moreover, they are almost equally soluble in the same solvents and hence cannot be separated by fractional crystallization.

We have now found that the complex hydro-ferrocyanide salt of para-amino-ethyl-benzene is relatively insoluble in dilute acid solution, whereas the corresponding salt of the ortho compound is much more soluble. Hence, the separation of the isomers may be effected by precipitating the salt of the para compound, filtering the precipitated salt from the solution, and regenerating para-amino-ethyl-benzene from the insoluble salt by treating the same with an alkali. Ortho-amino-ethyl-benzene is recovered by alkalizing the filtrate.

In practicing the invention the isomeric mixture of amino-ethyl-benzenes is preferably dissolved in approximately one chemical equivalent of an aqueous solution of a strong mineral acid, such as sulfuric or hydrochloric acid, so that the solution shall have a pH value preferably between 1 and 3. Mineral acid of sufficient dilution to produce such pH value may initially be employed to dissolve the amino-ethyl-benzene mixture, or a stronger acid solution may be used and the resulting solution diluted to the desired pH value. Approximately ½ molecular equivalent of an aqueous solution of a soluble ferrocyanide, e. g. sodium or potassium ferrocyanide, is then added and the complex hydroferrocyanide salt of para-amino-ethyl-benzene precipitates as a heavy mass of greenish-white crystals, which are filtered off and washed with a saturated sodium chloride solution and thereafter dissolved in a dilute aqueous solution of an alkali, e. g. sodium or potassium hydroxide. Crude para-amino-ethyl-benzene separates from the alkaline solution as a yellow-insoluble oil which is drawn off and purified by fractional distillation. The acid filtrate containing the soluble ortho salt is treated with an alkaline solution in the same manner, whereby crude ortho-amino-ethyl-benzene separates as an insoluble oil which is fractionally distilled to obtain the pure compound. The alkali metal ferrocyanide may be recovered by evaporation of the water layer.

A single treatment of a mixture of ortho- and para-amino-ethyl-benzene as just described is usually adequate to separate each isomer in a form sufficiently pure for most purposes. However, it may sometimes be desirable to effect a more complete separation, in which case each of the initial products may be further purified by retreatment with a ferrocyanide in accordance with the method just given.

The following examples illustrate various ways in which the principle of our invention has been employed but are not to be construed as limiting the invention:

Example 1

6.7 pounds (0.05 mole) of a mixture of ortho- and para-amino-ethyl-benzene isomers (F. P. between $-11°$ and $-15°$ C.) was dissolved in 7.0 pounds (0.06 mole) of 30 per cent aqueous hydrochloric acid solution and the resultant solution was diluted with approximately 30 pounds of water. 9.0 pounds (0.025 mole) of sodium ferrocyanide tri-hydrate ($Na_4Fe(CN)_6 \cdot 3H_2O$) in the form of a saturated aqueous solution was added to the acid solution, whereby the hydroferrocyanide salt of para-amino-ethyl-benzene was precipitated. The precipitated salt was filtered off and washed once with a cold saturated solution of sodium chloride. The filtrate was treated with approximately 2.4 pounds (0.06 mole) of sodium hydroxide in aqueous solution, whereupon ortho-amino-ethyl-benzene separated as an insoluble oil which floated on top of the water. The oil layer was drawn off and fractionally distilled under vacuum to obtain 1.0 pound of ortho-amino-ethyl-benzene, a colorless oil which had a freezing point below $-45°$ C. The crystals of the hydroferrocyanide salt of para-amino-ethyl-benzene were dissolved in aqueous sodium hydroxide, whereupon the free amino compound separated as an oil which was drawn off and fractionally distilled under vacuum to obtain 5.6 pounds of para-amino-ethyl-benzene, a colorless oil having a freezing point between −6° and −10° C. The recovery of the amino compound was 98.5 per cent of the theoretical.

*Example 2*

5.5 pounds of a mixture of ortho- and para-amino-ethyl-benzene isomers (F. P. between −11° and −15° C.) was dissolved in 6.0 pounds of 30 per cent hydrochloric acid and the resultant solution was diluted with water as in Example 1. A saturated solution of 8.0 pounds of sodium ferrocyanide, recovered from the run described in Example 1, was then added to precipitate the hydroferrocyanide salt of para-amino-ethyl-benzene. The precipitated salt was filtered off, washed, dissolved in aqueous sodium hydroxide, and the insoluble oil which formed fractionally distilled under vacuum. There was obtained 4.3 pounds of para-amino-ethyl-benzene, having a freezing point between −8° and −12° C. The filtrate was treated with alkali and the oil distilled as above to obtain 1.0 pound of ortho-amino-ethyl-benzene, having a freezing point below −45° C. The recovery was 96.4 per cent of the theoretical. The para compound was further purified from the ortho isomer by redissolving, precipitating the complex hydroferrocyanide salt, and regenerating and distilling the free amino compound as before. There was obtained 3.55 pounds of purified para-amino-ethyl-benzene having a freezing point between −7° and −8° C., and 0.5 pound of ortho-amino-ethyl-benzene. The overall recovery of amino-ethyl-benzene was 92 per cent of the theoretical.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of separating ortho- and para-amino-ethyl-benzene from a mixture thereof, the steps which comprise dissolving the same in a dilute mineral acid and precipitating a salt of para-amino-ethyl-benzene from the solution by treating the same with a water-soluble ferrocyanide.

2. In a method of separating ortho- and para-amino-ethyl-benzene from a mixture thereof, the steps which comprise dissolving the same in a dilute mineral acid, precipitating a salt of para-amino-ethyl-benzene from the solution by treating the same with a water-soluble ferrocyanide, separating the precipitate from the filtrate, and treating the precipitate with an alkali to recover para-amino-ethyl-benzene therefrom.

3. In a method of separating ortho- and para-amino-ethyl-benzene from a mixture thereof, the steps which comprise dissolving the same in a dilute mineral acid, precipitating a salt of para-amino-ethyl-benzene from the solution by treating the same with a water-soluble ferrocyanide, separating the precipitate from the filtrate with an alkali, and treating the filtrate to recover ortho-amino-ethyl-benzene therefrom.

4. In a method of separating ortho- and para-amino-ethyl-benzene from a mixture thereof, the steps which comprise dissolving the same in aqueous hydrochloric acid to form a solution of pH value between about 1 and about 3, and precipitating a salt of para-amino-ethyl-benzene from the solution by treating the same with an aqueous solution of sodium ferrocyanide.

5. In a method of separating ortho- and para-amino-ethyl-benzene from a mixture thereof, the steps which comprise dissolving the same in aqueous hydrochloric acid to form a solution of pH value between about 1 and about 3, precipitating a salt of para-amino-ethyl-benzene from the solution by treating the same with an aqueous solution of sodium ferrocyanide, separating the precipitate from the filtrate, and treating the precipitate with aqueous sodium hydroxide to recover para-amino-ethyl-benzene therefrom.

6. In a method of separating ortho- and para-amino-ethyl-benzene from a mixture thereof, the steps which comprise dissolving the same in aqueous hydrochloric acid to form a solution of pH value between about 1 and about 3, precipitating a salt of para-amino-ethyl-benzene from the solution by treating the same with an aqueous solution of sodium ferrocyanide, separating the precipitate from the filtrate, and treating the filtrate with aqueous sodium hydroxide to recover ortho-amino-ethyl-benzene therefrom.

ROBERT R. DREISBACH.
JAMES DAY.